United States Patent [19]
Henein et al.

[11] Patent Number: 5,307,894
[45] Date of Patent: May 3, 1994

[54] HYDRAULIC POWER STEERING SYSTEM FOR AUTOMOTIVE VEHICLES

[75] Inventors: Nabil Henein, Heidelberger; Wilhelm Beer, Ruesselsheim, both of Fed. Rep. of Germany

[73] Assignee: Alfred Teves GmbH, Fed. Rep. of Germany

[21] Appl. No.: 927,300

[22] PCT Filed: Jan. 15, 1992

[86] PCT No.: PCT/EP92/00070
§ 371 Date: Sep. 22, 1992
§ 102(e) Date: Sep. 22, 1992

[87] PCT Pub. No.: WO92/12887
PCT Pub. Date: Aug. 6, 1992

[30] Foreign Application Priority Data
Jan. 26, 1991 [DE] Fed. Rep. of Germany ....... 4102264

[51] Int. Cl.⁵ .............................................. B62D 5/06
[52] U.S. Cl. ................................... 180/132; 180/148; 417/363
[58] Field of Search ............... 180/132, 140, 146, 147, 180/148, 154; 74/498; 248/635; 417/363

[56] References Cited
U.S. PATENT DOCUMENTS

| | | | |
|---|---|---|---|
| 4,512,367 | 4/1985 | Abe et al. | 180/132 X |
| 4,673,051 | 6/1987 | Darling et al. | 180/132 |
| 4,742,882 | 5/1988 | Shimizu et al. | 180/148 X |
| 4,821,828 | 4/1989 | Schwerzler et al. | 248/635 X |
| 4,924,670 | 5/1990 | Bausch et al. | 417/490 X |
| 5,096,153 | 3/1992 | Seeley et al. | 248/635 |
| 5,141,069 | 8/1992 | Yasui | 180/79.1 |

*Primary Examiner*—Margaret A. Focarino
*Assistant Examiner*—Victor E. Johnson
*Attorney, Agent, or Firm*—Dykema Gossett

[57] ABSTRACT

The present invention relates to a hydraulic power steering system for automotive vehicles, having a steering gear with housing, steering shaft and steering rack, a hydraulic cylinder coupled to said steering rack, a pump and a steering valve, with all individual parts of the steering system forming a pre-assembly unit. This does not only permit a "just-in-time" delivery of the completely assembled, fluid-filled and tested system to the car maker, but also eases disassembly when the vehicle is junked. Thus, the power steering system according to this invention is inexpensive and can be recycled in an environment-friendly manner. The invention also includes a noise and vibration damping mounting arrangement. Still further, the invention includes an electric pump assembly.

2 Claims, 1 Drawing Sheet

HYDRAULIC POWER STEERING SYSTEM FOR AUTOMOTIVE VEHICLES

BACKGROUND OF THE INVENTION

A typical hydraulic power steering system for automotive vehicles includes a steering gear with housing, steering shaft and steering rack, a hydraulic cylinder coupled to said steering rack, a pump and a steering valve which controls the pressure fluid flow from the pump to the hydraulic cylinder in dependence on the actuation of steering. Steering systems of the like are fitted to many passenger vehicles, particularly to more expensive cars. Usually, the single component parts are mounted one after the other directly into the vehicle body on the body assembly line. After the assembly, the system is filled with pressure fluid, vented and tested. If any defect is found, the defective parts must be disassembled and replaced with great effort. Additionally, it is expensive to warehouse the various components at the vehicle maker's premises.

Another disadvantage of the known power steering systems is that, once the automotive vehicle is used up or junked, they can be recycled only by entailing great expenditure in time and cost. In this case, took, all elements would have to be disassembled one by one from the vehicle, and the system within the vehicle would have to be previously discharged. This shortcoming is particularly important in view of forthcoming legal regulations concerning the re-cycling of old cars and their component parts.

SUMMARY OF THE INVENTION

Therefore, it is an object of the present invention to provide a completely mountable, tested and fluid-filled hydraulic power steering system which satisfies demands on industrial production, logistics sequences and the ability to recycle and which, in addition, entails low costs.

The power steering system of the present invention includes all the individual component parts pre-assembled into a pre-tested ready to install unit. The assembly of the complete unit which was fluid-filled, vented and tested outside of the vehicle can be carried out by an industrial robot, and the delivery is effected "just in time". Owing to the small distances between pump, valve and hydraulic cylinder only short hoses are required which consequently minimizes the share in elastomerics polluting the environment. Since the entire system can also be disassembled as a unit, low-cost recycling is possible.

A favorable improvement upon the present invention has a pump that is driven by an electric motor which is rigidly coupled to the pump. In contrast to pumps driven by an internal-combustion engine which must be driven by the crankshaft via a belt and wherein the driving the belt can be attached only after the pump and other components are mounted to the vehicle, electromotively driven pumps can be mounted together with the motor into the assembly unit. After the assembly unit has been fitted to the automotive vehicle, it is merely required to connect a wire plug to the power supply for furnishing the motor with energy.

For the purpose of damping of noise and vibration, damping elements are interposed between the pump and the other component parts. In this way, the vibrations which inevitably are caused on operation of the pump will not be transmitted to other elements.

The sound attenuation is particularly expedient when the damping elements are attached to the pump housing in the area of vibration nodes. This is because the smallest vibration amplitudes occur in such nodes, and for this reason the vibrations are transmitted only relatively weakly in these points.

The present invention is described hereinbelow by way of the example illustrated in the accompanying drawings.

DETAILED DESCRIPTION OF THE INVENTION

Figure 1:
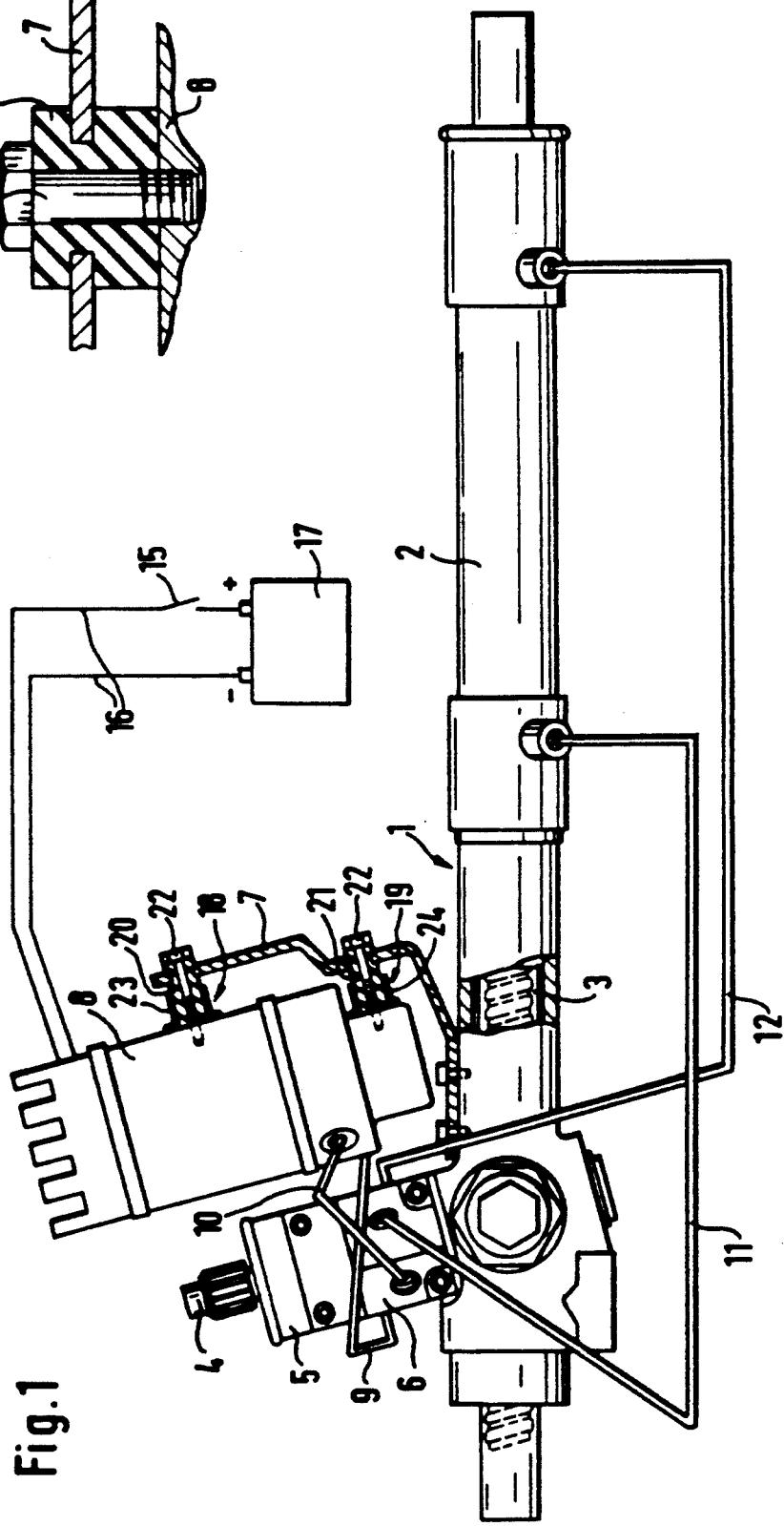
FIG. 1 is a power steering system wherein all component parts form an assembly unit.

FIG. 1 is a schematic view of the power steering system. The housing 1 accommodates the hydraulic cylinder 2 and the steering rack 3. The steering shaft 4 projects out of a portion 5 of the housing 1. The steering valve 6 is rigidly coupled to the housing 1 and is placed ahead of the steering shaft 4 in the illustration chosen. The motor-pump-assembly 8 is coupled rigidly to the housing 1 via the pump holding means 7 attached to the housing 1.

Hydraulic lines 9, 10, 11 and 12 lead from the motor-pump-assembly 8 and from the hydraulic cylinder 2 to the steering valve 6. The steering valve 6 is controlled in response to the steering actuation and connects the lines 9, 10, 11 and 12 correspondingly.

Arranged on the steering shaft 4 is a non-illustrated steering angle sensor and/or steering speed sensor whose output signal is supplied to a control unit which, advantageously, is integrated in the motor-pump-assembly 8. The control unit is furnished with further signals such a signal representative of the vehicle speed. The control unit controls the voltage supply of the pump motor, e.g. via a switch 15 in the electric connection 16 between the motor-pump-assembly 8 and the accumulator or battery 17 of the automotive vehicle. In this way, all electric components will not start to run immediately once the ignition key is turned. For instance, a delay of some seconds is expedient to avoid a current peak.

Figure 2:
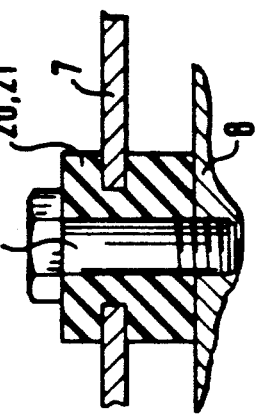
FIG. 2 is a damping element, shown on an enlarged scale.

Damping elements 20 and 21, respectively, are arranged at the junction points 18 and 19 between the pump holding means 7 rigidly coupled to the housing 1 and the motor-pump-assembly 8. One of these damping elements is shown on an enlarged scale in FIG. 2. The screw 22 screwed to the motor-pump-assembly 8 is not in direct contact with the pump holding means 7 but is only in contact with the damping element 20 and 21, respectively. In the embodiment according to FIG. 1, each damping element 20 and 21 is still encompassed by a bushing 23 and 24, respectively, for the purpose of stabilization. This arrangement permits an almost complete insulation of noise and vibration between motor-pump-assembly 8 and housing 1.

What is claimed is:

1. A hydraulic power steering system for use in automotive vehicles; comprising:
    an integral pump and motor assembly including a hydraulic pump rigidly coupled to an electric motor;

a steering assembly hydraulically coupled to said hydraulic pump;

a pump holding means having first and second ends, said first end coupled to said steering assembly, and a damping element attached to and between said integral assembly and said second end of said pump holding means for attaching the assemblies together, said damping element attached at a location along said integral assembly where a vibration node forms during operation of said integral assembly.

2. A hydraulic power steering system for use in automotive vehicles, comprising:

a steering housing;

a steering gear, a steering shaft, and a steering rack contained within said steering housing;

a hydraulic cylinder coupled to said steering rack, an integral pump and motor assembly including a hydraulic pump rigidly coupled to an electric motor, said hydraulic pump hydraulically coupled to said hydraulic cylinder;

a steering valve for controlling the pressure of hydraulic fluid circulated between the pump assembly and the hydraulic cylinder;

a pump holding means having a first and second ends, said first end coupled to said steering housing, and a damping element attached to and between said integral assembly and said second end of said pump holding means, wherein said damping element is attached to said integral assembly at a location where a vibration node forms during normal operation of said integral assembly.

* * * * *